United States Patent [19]
Hackett et al.

[11] 3,929,394
[45] Dec. 30, 1975

[54] SHAFT JOURNAL BEARING LUBRICATION SYSTEM

[75] Inventors: David E. Hackett, Washington; Frank E. Keske, Chillicothe, both of Ill.

[73] Assignee: Caterpillar Tractor Co., Peoria, Ill.

[22] Filed: June 30, 1975

[21] Appl. No.: 591,664

[52] U.S. Cl. .............................................. 308/121
[51] Int. Cl.² ..................... B61F 17/00; F16C 13/02; F16C 1/24; F16C 33/66
[58] Field of Search .................. 308/121, 79; 184/6

[56] References Cited
UNITED STATES PATENTS

| | | | |
|---|---|---|---|
| 2,014,584 | 9/1935 | Peineke et al. | 308/121 |
| 2,169,296 | 8/1939 | Smith | 308/121 |
| 2,723,003 | 11/1955 | Antonsen | 184/6 |
| 2,926,972 | 3/1960 | Burrell | 308/121 |
| 2,960,370 | 11/1960 | Love et al. | 308/121 |
| 3,085,837 | 4/1963 | Wallgren | 308/121 |

*Primary Examiner*—Lloyd L. King
*Attorney, Agent, or Firm*—Oscar G. Pence

[57] ABSTRACT

An annular bearing carried by a journal box in circumferentially embracing relation about a journal of a shaft is sized so as to provide a predetermined clearance between it and such journal to permit relatively free rotation of the shaft therewithin. A lubrication system includes lubricating fluid contained within a sealed annular chamber disposed in communication with the clearance so as to direct a flow of such fluid axially through the clearance for lubrication of the bearing and journal. The chamber is cooperatively formed between a radially extending shoulder provided on the shaft at one end of the journal in juxtaposed relation to the journal box and an adjacent end of the bearing.

14 Claims, 2 Drawing Figures

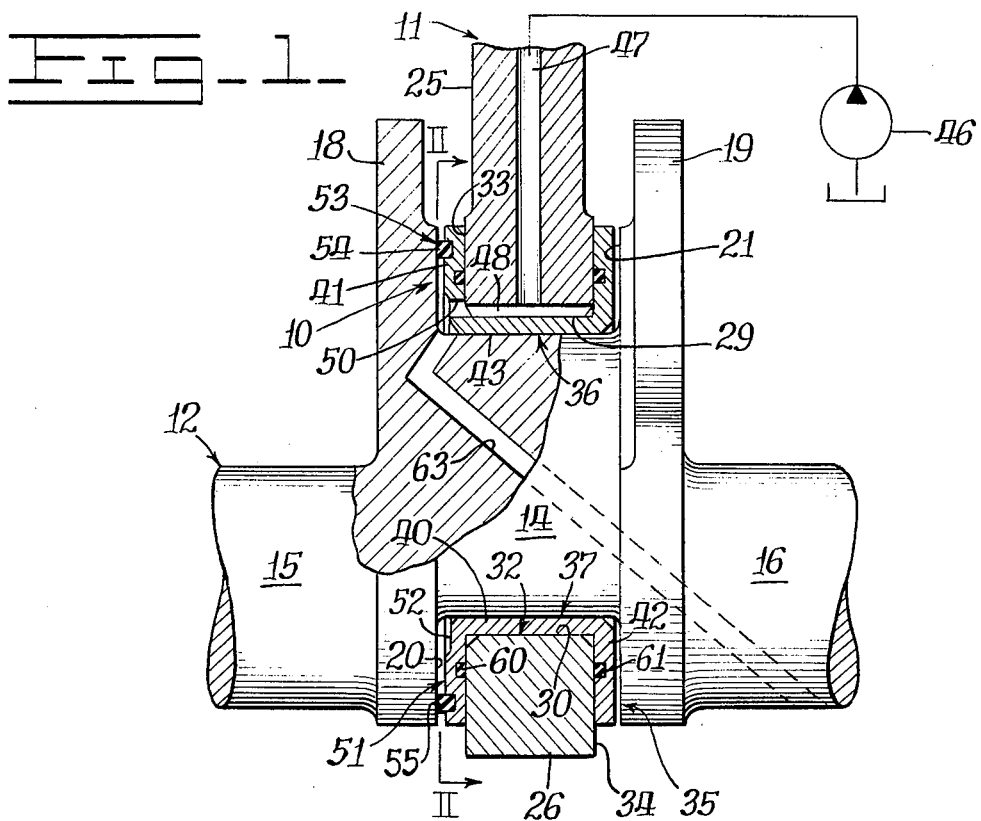
Fig-1-
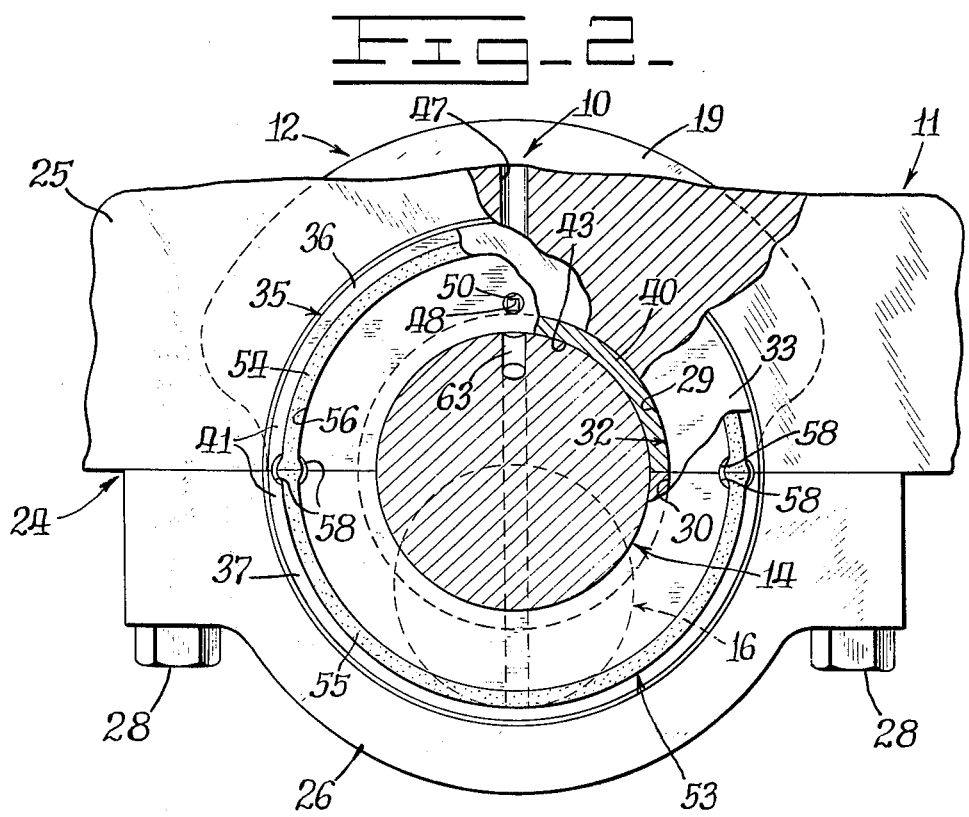
Fig-2-

SHAFT JOURNAL BEARING LUBRICATION SYSTEM

BACKGROUND OF THE INVENTION

This invention relates to the lubrication of bearings and shaft journals and more particularly to the lubrication of a main bearing and crankshaft journal for an internal combustion engine.

Prior art engine crankshaft main bearings are typically of the split sleeve type which are provied with a centrally disposed oil groove circumferentially formed in the inner bearing surface of one bearing half for distributing oil for lubricating purposes. Such groove tends to permit a ridge to be formed on the mating journal surface of the crankshaft during its rotation within the bearing. The ridge, in turn, wears a groove into the other half of the bearing. This ridge-groove wear pattern reduces the load carrying capacity of the bearing and leads to premature bearing failure and possible injury to the crankshaft journal causing its replacement or the necessity of regrinding such journal with the replacement of the bearing.

Prior art crankshafts also normally have oil transfer passages between the main bearing journals and adjoining rod journals for lubrication of the connecting rod bearings. Such passages typically open in the center of their respective journal surfaces which also tends to reduce the load carrying capacity of the bearing and interrupts the oil film across the journal.

OBJECTS OF THE INVENTION

Accordingly, an object of this invention is to provide a lubrication system for lubricating the bearing of a journal box and the journal of a shaft rotatably mounted within the journal box which system is effective in overcoming the above stated problems of the prior art lubrication methods and which increases the load carrying capacity of its associated bearing through the elimination of the centrally disposed oil distribution grooves in such prior art bearings to allow the use of the full width of the bearing for supporting purposes.

Another object of this invention is to provide such lubrication system which is effective in increasing the useful service life of its bearing by eliminating the ridge-groove wear problem associated with such oil distribution groove.

Another object of this invention is to provide a lubrication system which also increases the load carrying capacity of the bearing by alleviating any undue disruptions in the oil film between the bearing and journal by eliminating the opening of any transfer passages in the journal surface of the shaft.

Other objects and advantages of the present invention will become more readily apparent upon reference to the accompanying drawings and following description.

BRIEF DESCRIPTION OF THE DRAWINGS

FIG. 1 is a longitudinal cross sectional view of a portion of an internal combustion engine through one of its crankshaft main bearing journal boxes and illustrating an improved lubrication system therefor embodying the principles of the present invention.

FIG. 2 is a transverse cross sectional view taken along the line II—II of FIG. 1.

DETAILED DESCRIPTION OF THE PREFERRED EMBODIMENT

Referring more particularly to the drawings, an improved lubrication system embodying the principles of the present invention is generally indicated at 10 in FIG. 1 in association with a main bearing journal box 11 for rotatably mounting a shaft, such as an engine crankshaft, partially shown at 12, of an internal combustion engine, not shown.

The crankshaft 12, as depicted in FIG. 1, includes a main journal 14 and a pair of radially offsetting connecting rod journals 15 and 16 at the opposite ends of the main journal. A pair of axially spaced throw supporting and radially extended counterweight flanges 18 and 19 are individually disposed between the main journal and the rod journals. Such flanges provide a pair of radially extending shoulders 20 and 21 at the opposite ends of the main journal 14 for purposes hereinafter more fully described.

The main journal box 11 is constructed from separable saddle and cap portions 25 and 26. The saddle and cap portions are each provided with mating, complementary semi-cylindrical bearing seating surfaces 29 and 30, respectively, which define a bearing mounting bore 32 therethrough when the portions are secured together in a conventional manner, such as by bolts 28. The saddle and cap portions are also provided with equal thicknesses about the bore so as to define opposite, alignable sides 33 and 34 at the opposite ends of such bore. Such sides are disposed in predetermined spaced relation from respective ones of the shoulders 20 and 21 of the crankshaft 12.

A split-type main bearing 35 is provided within the journal box 11 for rotatably mounting the main journal 14. The split main bearing includes a pair of mating bearing halves 36 and 37 with each half having a semi-cylindrical sleeve bearing portion 40 and a pair of radially outwardly extending flange portions 41 and 42 at the opposite ends of the sleeve portions. The sleeve bearing portions 40 are positionable in nonrotatable, seating engagement within respective ones of the semi-cylindrical surfaces 29 and 30 of the saddle and cap portions 25 and 26, respectively, and cooperatively define an inner bearing surface 43 positionable in circumferentially embracing relation about the main journal 14. The inner bearing surface is diametrically sized so as to provide a predetermined small amount of clearance, not visibly shown, between it and the main journal 14. Such clearance is preferably the customary design clearance for the particular engine in which the present invention is employed to provide the normal running fit to permit relatively free rotation of the shaft within the bearing so as to prevent bearing seizure and the like. The flange portions 41 and 42 are spaced so as to be received in juxtaposed relation against respective ones of the sides 33 and 34 of the journal box and in predetermined spaced relation with respect to the shoulders 20 and 21 of the crankshaft.

The lubrication system 10 includes a source of lubricating oil under pressure, such as provided by an engine oil pump 46. The pump is connected in a conventional manner to a radially extending passage 47 formed in the saddle portion 25 of the journal box. An axially disposed slot 48 is cut into the seating surface 29 of the saddle portion in communication with the radial passage 47. An opening 50 is formed through the flange portion 41 of bearing half 36 in alignment with the slot to communicate the lubricant with an annular chamber 51 cooperatively formed between the shoulder 20 of the crankshaft 12 and the flange portions 41 due to the spaced relationship therebetween. A stepped relief 52 is preferably provided in the flange portions 41 for increasing the capacity of the chamber.

The chamber is sealed by a rotary seal 53 defined by a pair of resilient seal members 54 and 55. Each seal member consists of a strip of resilient seal material. The strips are individually secured in any conventional manner, such as by bonding, in one of a pair of complementary semi-annular grooves 56 formed in each of the flange portions 41 adjacent the free ends of such flange portions. The strips of seal material are preferably provided with a length which is slightly greater than the circumferential length of their respective grooves so that the opposite ends of the seal members extend slightly beyond the ends of their respective bearing halves 36 and 37. This insures the tight abutting engagement of the adjoining ends of the seal members when the bearing halves are assembled. As best shown in FIG. 2, a relief 58 is provided at each end of the grooves so as to accommodate any extrusion of the seal material caused by such abutting engagement.

A pair of static seals 60 and 61 are individually mounted in a similar manner in grooves formed in the inwardly facing sides of the flange portions 41 and 42 for sealing engagement against their adjacent sides 33 and 34 of the saddle and cap portions of the journal box.

To provide lubrication to the adjacent rod journal 16, an annularly disposed transfer passage 63 is provided in interconnecting relation between the annular chamber 51 and such rod journal.

OPERATION

While the operation of the present invention is believed clearly apparent from the foregoing description, further amplification will be made in the following brief summary of such operation. With the engine running, lubricating oil from the oil pump 46 enters through the inlet passage 47 and travels through the slot 48 and the opening 50 into the annular chamber 51.

It will be appreciated that the escape of oil from between the flange portions 41 and 42 and the sides 33 and 34 of the saddle and cap portions of the journal box 11 is effectively prevented by the static seals 60 and 61. Alternately, a tight sealing fit may be provided between the flange portions and the sides 33 and 34 so as to permit the elimination of one or both of the seals 60 and 61. The lubricant in the chamber 51, as is readily apparent, is in communication with one end of the clearance between the mating surfaces of the journal 14 and bearing 35. Because the oil is prevented from escaping from between the shoulder 20 and flange portions 41 by the rotary seal 53, such oil is caused to flow axially through the clearance from the end of the journal adjacent the chamber to its opposite end. The oil is then exhausted from the opposite end between the flanges 42 and the shoulder 21 of the crankshaft.

Oil in the chamber 51 is also permitted to flow through the transfer passage 63 to effect the lubrication of the adjoining rod journal 16 in a conventional manner.

Thus, as is readily apparent from the foregoing, the particular construction of the present lubrication system fully satisfies the objects of the present invention by eliminating the customary centrally disposed oil groove in the one half of the prior art main bearings, thus alleviating the ridge-groove wear problem associated therewith. The elimination of such groove, as well as the opening of any transfer passages or the like in the journal surface is effective in eliminating any oil supporting film disruptions, as well as in increasing the load carrying capacity of the main bearing by allowing the utilization of the full width of the bearing for supporting the loads encountered during operation. While the present invention has been described and shown with particular reference to the preferred embodiment, it will be apparent that variations might be possible that would fall within the scope of the present invention, which is not intended to be limited except as defined in the following claims.

What is claimed is:

1. A lubrication system, for a journal box and a cylindrical journal of a shaft rotatably mounted within such journal box, comprising:
    a radially extending shoulder provided on the shaft at one end of said journal in juxtaposed relation to said journal box;
    annular bearing means carried by said journal box in circumferentially embracing relation about said journal and having a predetermined clearance therewith to permit relatively free rotation of the shaft therewithin; and
    lubricating means including means between said shoulder of the shaft and the adjacent end of said bearing means forming a sealed annular chamber for lubricating fluid in communication with said clearance for directing a flow of such fluid axially through said clearance for lubrication of said bearing means and journal.

2. The lubrication system of claim 1 wherein said journal box includes a bearing mounting bore therethrough, and said bearing means includes a sleeve bearing portion disposed in nonrotatable, seating engagement within said bore and a flange portion extending radially outwardly from the end of said sleeve portion adjacent said shoulder of the shaft and in spaced opposing relation thereto for cooperatively defining said chamber therebetween.

3. The lubrication system of claim 2 wherein said lubricating means includes:
    rotary seal means carried at the free end of said flange portion of the bearing means in sealing engagement with said shoulder of the shaft; and
    means for supplying lubricating fluid under pressure to said chamber inwardly of said seal means.

4. The lubricating system of claim 3 wherein said means for supplying lubricating fluid to said chamber includes:
    a radially extending inlet passage formed through said journal box and opening into said bearing mounting bore;
    an axially disposed slot formed into said bore communication with said passage and said flange portion of said bearing means; and
    an opening formed through said flange portion in alignment with said slot for communicating said fluid into said chamber.

5. The system of claim 1 wherein:
    said journal box includes separable saddle and cap portions having complementary semi-cylindrical surfaces defining a bearing mounting bore through said journal box; and said bearing means includes a pair of mating bearing halves, each half having a semi-cylindrical sleeve bearing portion positionable in nonrotatable, seating engagement within respective ones of said complementary semi-cylindrical surfaces.

6. The system of claim 5 wherein;
said saddle and cap portions are of equal thicknesses about said mounting bore to define opposite, alignable sides at the opposite ends of said bore; and
each of said bearing halves includes first and second flange portions extending radially outwardly from the opposite ends of their sleeve bearing portions in juxtaposed relation against the opposite sides of their corresponding saddle and cap portions with said first flange portions of said bearing halves being adjacent said one end of said journal and disposed in spaced opposing relation to said shoulder of the shaft for cooperatively forming said chamber therebetween.

7. The system of claim 6 wherein said lubricating means includes:
rotary seal means carried at the free ends of said first flange portions in sealing engagement with said shoulder of the shaft; and
means for supplying lubricating fluid under pressure to said chamber inwardly to said seal means.

8. The system of claim 7 wherein said means for supplying lubricating fluid includes:
a radially extending inlet passage formed through said saddle portion of said journal box and opening into its respective semi-cylindrical surface;
an axially extending slot formed in said semi-cylindrical surface of said saddle portion in communication with said inlet passage; and
an opening formed through the first flange portion of the bearing half in said saddle portion in alignment with said slot for communicating such fluid into said chamber.

9. The system of claim 8 wherein said rotary seal means includes a pair of semi-annular grooves individually formed in said first flange portions of said bearing halves, and a pair of strips of resilient seal material individually bonded into respective ones of said grooves.

10. The system of claim 9 wherein each of said strips of resilient seal material is slightly longer than its respective groove for ensuring the tight abutting engagement of the opposite ends of one strip with the adjacent ends of the other strip upon assembly to prevent leakage therebetween, and the opposite ends of said seal grooves are each provided with a relief so as to accommodate any extrusion of the resilient seal material due to such abutting engagement.

11. The apparatus of claim 10 wherein said lubricating means includes a pair of annular seals individually disposed between the opposite sides of the saddle and cap portions of said journal box and the corresponding flange portions of said bearing halves to prevent the escape of fluid therebetween.

12. A lubrication system, for a main journal box of an internal combustion engine having separable saddle and cap portions for mounting the respective halves of a split sleeve-type main bearing, which bearing is sized to provide a predetermined running clearance between it and a main journal of an engine crankshaft about which the bearing is circumferentially disposed for permitting relatively free rotation of the crankshaft within such bearing, comprising:
a radially extending shoulder provided on said crankshaft at one end of said main journal thereof;
radially outwardly extending flange means provided at one end of said main bearing in spaced opposing relation to said shoulder of the shaft for cooperatively defining an annular chamber therewith in communication with said clearance; and
lubricating means including rotary seal means carried at the free end of said flange means in sealing engagement with said shoulder for sealing said chamber and means for supplying lubricating fluid under pressure to said chamber inwardly of said seal means so that said fluid flows axially through said clearance from the one end of said journal to the other for effecting the lubrication of said main bearing.

13. The system of claim 12 wherein said lubricating means includes inlet fluid passage means disposed within said saddle portion of the journal box, and an opening formed through said flange means in communication with said inlet passage means for communicating said fluid into said chamber.

14. The system of claim 13 wherein said crankshaft includes an adjoining rod journal, and a transfer passage interconnecting said chamber with said rod journal for lubrication thereof.

* * * * *